Patented Sept. 5, 1933

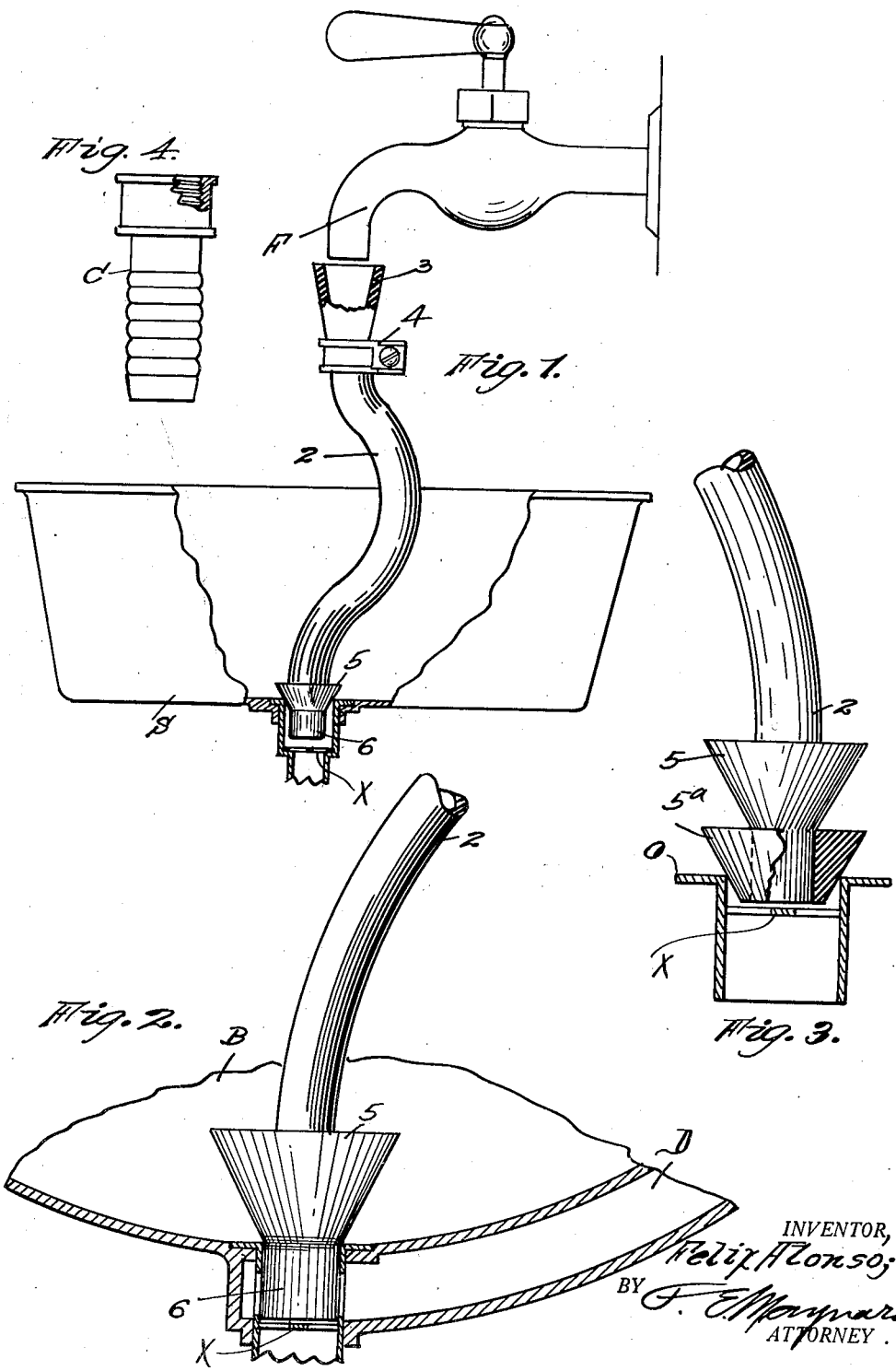

1,925,359

UNITED STATES PATENT OFFICE 1,925,359

PRESSURE, PLUMBING DRAIN FLUSHER

Felix Alonso, Belvedere Gardens, Calif.

Application February 18, 1933. Serial No. 657,418

1 Claim. (Cl. 4—256)

This invention relates to plumbing accessories and more especially to drain cleaners.

It is well known that much annoyance is caused by the frequent clogging of the drain pipes from sinks, lavatories and laundry tubs. Also these elements are severally provided with different types of outlets and throat guards.

It is an object of the present invention to provide a pressure flusher set for use on or with any of the several drains above referred to to effect the rapid clean-out of the drain pipe.

Further, an object is to provide for adoption to various types of faucet mouths, some being threaded and others being threadless and the sizes varying.

Also it is an object to provide a flusher which is simple, practical and of such low cost that it may be readily purchased for and as a household implement.

The invention consists in certain advancements in this art as set forth in the ensuing disclosure and having, with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is a sectional elevation of the device as applied to a sink.

Figure 2 is sectional detail of a lavatory showing an adapter flusher.

Figure 3 is detail showing the flusher provided with an adapter to use upon a high-up guard.

Figure 4 is a side view of a hose coupling for use on faucets having a threaded mouth.

The flusher comprises a stout flexible hose 2 of a length to extend from a faucet F to the drain of the relative vessel such as the sink S, or the basin B, or the outlet O of a tray or tub.

One end of the hose has a flared mouth 3 to fit various sizes of faucet mouths and has a clamp collar 4 to effect a tight fit thereon. Should a faucet have a threaded mouth then a hose coupler C is fitted to the hose and clamped in.

Near the opposite end of the hose is a firm, flat-topped, fixed, frusto-conoidal boss 5 converging toward a nipple 6 which is of a size to snugly fit into the outlet of a lavatory outlet having an overflow duct D so that this will be closed off to prevent the flushing water from the faucet F flowing up the duct.

Some vessels of the class concerned have drain crosses X, Fig. 3, so high that the nipple 6 will engage it and prevent the boss 5 from closing on the rim of the outlet. In such a case an adapter boss 5a is tightly fitted onto the nipple 6 and will seal on the outlet.

In operation after the hose has been fitted to the faucet and the proper shut-off boss applied to the vessel outlet the faucet (preferably for hot water) is opened gradually and the water is forced to the choked drain. As the causative matter is softened by the hot water it will quickly be forced out. If the passageway does not open under this treatment, the services of a plumber are required.

The upper, large end of the boss 5 forms a substantial rest for the fingers of the operator during operation of the device to hold the boss in place while water under pressure is forced through the drain.

What is claimed is:

A pressure flusher for clearing choked plumbing drains comprising a flexible hose with means on one end for attachment to a faucet mouth, the opposite end of the hose having a nipple for fitting in an outlet having an overflow connection, and a firm rigid boss of frusto-conoidal form set back from the nipple end and forming a substantial finger-rest while the boss is pressed to sealing position on the outlet and a supplemental boss part applicable to the nipple for use on given drain outlet types.

FELIX ALONSO.